(12) United States Patent
Tribble (10) Patent No.: US 7,340,406 B1
(45) Date of Patent: Mar. 4, 2008

(54) BUSINESS RULES SYSTEM

(75) Inventor: Rob Tribble, Danville, CA (US)

(73) Assignee: Netscape Communications Corporation, Mountain View, CA (US)

( * ) Notice: Subject to any disclaimer, the term of this patent is extended or adjusted under 35 U.S.C. 154(b) by 1624 days.

(21) Appl. No.: 09/668,125

(22) Filed: Sep. 21, 2000

(51) Int. Cl.
*G06F 17/50* (2006.01)

(52) U.S. Cl. ............................................. 705/7; 705/8

(58) Field of Classification Search ............ 705/7, 705/26, 10, 36, 8; 709/219
See application file for complete search history.

(56) References Cited

U.S. PATENT DOCUMENTS

| | | | | |
|---|---|---|---|---|
| 4,210,962 | A | * | 7/1980 | Marsh et al. .................... 705/7 |
| 5,117,358 | A | * | 5/1992 | Winkler ....................... 708/135 |
| 5,400,248 | A | * | 3/1995 | Chisholm ..................... 705/12 |
| 5,790,847 | A | * | 8/1998 | Fisk et al. ...................... 707/4 |
| 6,029,195 | A | * | 2/2000 | Herz ........................... 725/116 |
| 6,502,131 | B1 | * | 12/2002 | Vaid et al. ................... 709/224 |
| 6,578,008 | B1 | * | 6/2003 | Chacker ....................... 705/10 |
| 2002/0091550 | A1 | * | 7/2002 | White et al. .................... 705/4 |

* cited by examiner

*Primary Examiner*—Zeender Ryan Florian
*Assistant Examiner*—Vanel Frenel (74) *Attorney, Agent, or Firm*—Michael A. Glenn; Glenn Patent Group (57) ABSTRACT

A business rules system that creates a dynamic solution set between objects that have never been associated with one another prior to that particular instance of evaluation. A rule engine evaluates the associated objects and is programmed to evaluate a complex situation, come up with a solution and, as a result, not require the intervention of a human being. The rule engine enables the user to customize the behavior of business objects (e.g., access control, order management, catalogs, and membership) to meet sophisticated business requirements. The invention provides a graphical user interface that allows a user to rapidly set up and maintain Business Rules in real time—with no source code recompilation needed. Domain tables are used to define the overall set of possible values for a given attribute of an object. Each rule may have one to many classes of interacting objects. A voter is a member or business object such as a product, price list, or ship-to location that provides input to be evaluated by the rule. Each instance of a voter may have a data value (vote) for a specific rule and has a hierarchical inheritance. Rule resolution strategies are used by the invention to resolve any conflicts between specific preferences of voters and to determine the correct answer to be used in an application program. The sequence of business objects and the order of the values included in each object determine the values of the results. The rule resolution logic returns only one answer for a question referencing a set of business objects.

18 Claims, 11 Drawing Sheets

| | VOTER | VOTES | |
|---|---|---|---|
| 302 | SELLER COMPANY | VISA, MASTERCARD, AMERICAN EXPRESS, ON-ACCOUNT | 303 |
| 304 | BUYER COMPANY | VISA, AMERICAN EXPRESS, DISCOVER, CASH, ON-ACCOUNT | 305 |
| 306 | BUYER COMPANY PERSON | ON-ACCOUNT, VISA | 307 |

| RESOLUTION STRATEGY | DISCUSSION | RULE RESULT (ANSWER) |
|---|---|---|
| FIRST IN FIRST OUT | SELLER COMPANY IS FIRST VOTER EVALUATED. VOTES APPEAR IN THE ORDER EVALUATED. | VISA, MASTERCARD, AMERICAN EXPRESS, ON-ACCOUNT |
| LAST IN FIRST OUT | BUYER COMPANY PERSON IS THE LAST VOTER EVALUATED. VISA WAS THE LAST VOTE EVALUATED | VISA, ON-ACCOUNT |
| UNION OF SETS (UOS) | SELLER COMPANY EVALUATED FIRST, AND VOTES ADDED TO THE RULE RESULT. BUYER COMPANY IS EVALUATED SECOND, AND ANY NEW VOTES ARE ADDED TO THE RESULT. BUYER COMPANY PERSON IS EVALUATED THIRD, AND IT HAS NO NEW VOTES, AND THEREFORE NONE ARE ADDED TO THE RESULT. | VISA, MASTERCARD, AMERICAN EXPRESS, ON-ACCOUNT, DISCOVER, CASH |
| HIGHEST | A UOS IS DEVELOPED. RESULTS ARE PLACED IN DESCENDING ORDER. | VISA, ON-ACCOUNT, MASTERCARD, DISCOVER, CASH, AMERICAN EXPRESS |
| LOWEST | A UOS IS DEVELOPED. RESULTS ARE PLACED IN ASCENDING ORDER. | AMERICAN EXPRESS, CASH, DISCOVER, MASTERCARD, ON-ACCOUNT, VISA |

| | |
|---|---|
| PAYMENT METHOD: | [COMPANY DEFAULT ▼] NEW... |
| CUSTOMER P.O. #: | [ ] |
| SHIP VIA: | [COMPANY DEFAULT ▼] |
| PREFERRED DELIVERY DATE (MM/DD/YY): | [02/17/9] |
| TOTAL GOODS AND SERVICES: | 287.60 |
| ADJUSTMENTS: | 0.00 |
| NET TOTAL: | 287.60 |
| SHIPPING: | 6.70 |
| TAXABLE AMOUNT: | 294.30 |
| TAX: | 22.07 |
| TOTAL: | 316.37 |
| | [ RECALCULATE ] |

BUSINESS RULES SYSTEM

BACKGROUND OF THE INVENTION

1. Technical Field

The invention relates to electronic commerce in a computer environment. More particularly, the invention relates to the creation, organization, and resolution of rules modeling and governing the behavior of business transactions in a computer environment.

2. Description of the Prior Art

The problem in developing business applications is the nature of the "real-world." Developers have constricted business applications into set patterns and have "normalized" data and methods where possible. The problem arises when the real world changes and the developer has to change the application program code.

The concept of "parameters" used by an application program to specifically direct the application program on how to process data was popularized in the early years of data processing. An example of one of these parameters is the "run date." The run date parameter was used as a basis for calculating various other dates within the context of that one execution of that program. The run date could be used to calculate if payments were late or the expected ship date of a product.

The next logical step was to have a list of parameters passed to the program that controlled the programmatic behavior for the duration of the program execution. This list of parameters could include a variety of data, sometimes called switches, fields, toggles, indicators, etc. These parameters were constant for the entire duration of that program being executed, and were only changeable across multiple executions or batches of data. The parameters were fixed by design and required program changes to implement new behaviors.

The next major step was to include parametric fields into specific file formats. For example, a customer master record may have a taxability indicator using Yes (Y) or No (N). This indicator controls the application of sales tax based on the value of the field. The value could be selected by customer versus determined by batch execution of a program with a parameter and constant for all customers.

The industry then realized that data for customers and products may interact and produce different results. For example, a product record may have a taxability indicator (Y/N) that, when the product is not taxable, and the customer is taxable should result in no tax being paid. This is a simple and clear example of how specific instances of objects can interact.

However, the problem is that many objects may interact to define the correct answer and in ways that may not always be expected at the time a program is designed.

It would be advantageous to provide a business rules system that can create solution sets in reaction to the dynamic changes of the real-world business environment. It would further be advantageous to provide a business rules system that allows the user to easily create and maintain the rules describing and governing the system.

SUMMARY OF THE INVENTION

The invention provides a business rules system. The system creates dynamic solution sets in response to interactions between real-world objects. In addition, the invention provides a system that allows the user to easily create and maintain the rules describing and governing a business system.

A preferred embodiment of the invention creates a dynamic solution set between objects that have never been associated with one another prior to that particular instance of evaluation. A rule engine evaluates the associated objects. The rule engine is programmed to evaluate a complex situation, come up with a solution and, as a result, not require the intervention of a human being.

The invention's rule engine enables the user to customize the behavior of business objects (e.g., access control, order management, catalogs, and membership) to meet sophisticated business requirements. The invention provides a graphical user interface that allows a user to rapidly set up and maintain Business Rules in real time—with no source code recompilation needed. Domain tables are used to define the overall set of possible values for a given attribute of an object.

Each rule may have one to many classes of interacting objects. A voter is a member or business object such as a product, price list, or ship-to location that provides input to be evaluated by the rule. Each instance of a voter may have a data value (vote) for a specific rule. Voters also have a hierarchical inheritance.

Rule resolution strategies are used by the invention to resolve any conflicts between specific preferences of voters and to determine the correct answer to be used in an application program. The sequence of business objects and the order of the values included in each object determine the values of the results. The rule resolution logic returns only one answer for a question that references a set of business objects.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a business rules system in a computer environment. A system according to the invention creates dynamic solution sets in response to interactions between real-world objects. In addition, the invention provides a system that allows the user to easily create and maintain the rules describing and governing a business system.

A preferred embodiment of the invention creates a dynamic solution set between objects that have never been associated with one another prior to that particular instance of evaluation. A rule engine evaluates the associated objects. The rule engine is programmed to evaluate a complex situation, come up with a solution and, as a result, not require the intervention of a human being.

Administration functions are generalized and useful across all of the domain tables, rules, and dynamic business objects used in the system. If a programmer needs to make a decision in a method, then the answer will come from the rule engine and the logic stored as a Business Rule.

The use of a common approach to evaluate object relationships makes the testing and documentation of the results easier and more maintainable. This makes developers more productive along with the users experiencing a more predictable set of logic.

Business Rules can be thought as answers to specific problems that an application program needs to solve. In general, Business Rules do not define new logic. They define the appropriate action or actions to take given the context of the decision to be made.

Software must be able to deal with real-world changes dynamically. Business Rules allow the appropriate user to define "how" an interaction between specific objects might affect the outcome of the execution of a software component.

For example: The XYZ company does not allow split shipments today, next month its "Best" customer wants you to ship whatever you have as soon as possible. This means that the XYZ company needs to support split shipments next month, and only for that "Best" customer. The month after that, the "Best" customer calls up and says that is only true when you are shipping to "Ohio." A month later the "Best" customer calls again and says that this is true only when shipping via "FedEx."

The invention allows these changes to be easily made, dynamically, without changing or rebuilding the software components. The objectives of Business Rules are to allow the user to define:

a default value for a specific attribute of a specific instance of an object.
    a list of valid values for a specific attribute of a specific instance of an object.
    relationships between specific instances of objects.
    a specific attribute to a specific relationship between two or more specific objects.
    a default value for a specific attribute of a specific relationship.
    a list of valid values for a specific attribute of a specific relationship.
    the specific behavior (methods) to be used by specific objects in specific relationships.

Business Rules are dynamic and changeable using a "point & click" metaphor at run-time. The Business Rules approach allows the designer of an application to defer decisions until execution time. The application designer has the ability to:

At design time—define the specific behaviors or domain values available to be used ("possible" values).
    At execution time—allow the appropriate user to configure: the objects that will influence the decision; the values to be used by each influencing object; and the method by which they can interact with each other to produce a result. The administration of each individual object becomes the control point for the application behavior. This gives the appropriate user the ability to implement a point & click Interface for administration of the choices.

Domain tables are used to define the overall set of possible values for a given attribute of an object, e.g., a list of the currencies in the world today (domain=World). The key conceptual difference between the invention and other methodologies has to do with the concept of ownership of the domain table and the values of a specific instance of a table. For example, a list of currencies for use by this company (domain=XYZ company).

The next major conceptual point is the nature of the construction and administration of that construction. Construction can be:

"Static" or defined by some external standards body, e.g., a list of all Units of Measure can be found at the National Standards Bureau.
    "Configured" or defined by a person for use by a specific application, e.g., a list of the valid units of measure for a specific group of products.
    "Dynamic" or defined by the relationship between two classes of objects, e.g., a list of "Ship-To" locations for the XYZ Company.

The rules for construction and administration tend to be fairly simple:

1. Domain tables that are static are maintained by loading values from external sources. This may be Graphical User Interface (GUI) or file import based
2. Domain tables that are configured are maintained by a GUI which allows a privileged user to select specific values or to create new values as required to meet the business requirements of the owner of the table.
3. Domain tables that are dynamic are maintained by a GUI which allows a privileged user to select specific values from a list of possible values that are currently available in the existing Database Management System (DBMS) as required to meet the business requirements of the owner of the table.

To the degree that static tables can be derived from acceptable standards bodies, the easier the exchange of attribute values will become between multiple application systems.

Dynamic Business Objects (DBO) are defined as extensions to existing conceptual models for schema-based objects. These extensions are capable of:

Adding additional attributes to any object.
    Defining the value of a specific attribute for a specific instance of an object.

Defining the value for a specific attribute of a specific instance of an object when it interacts with other specific instances of objects.

Creating new Classes of Objects, instances of those new classes, and defining relationships, attributes, and values.

Supporting the implementation of a standard set of methods for DBO use.

The above extensions allow for the use of a "Soft-Schema" approach to the construction. The Soft-Schema approach is an extension of an object model based on a hard-schema. The Soft-Schema approach allows:

1. Developers to create new attributes for objects, test, and debug—without tedious time spent reconstructing (software build) all of the supporting environment.
2. Implementers at installed sites to add attributes to already designed objects without having to be concerned about the impact of the existing software.
3. Developers and implementers to easily develop add-on software capabilities that become release independent and thereby conserve investments in the application platform.

The strategic objective of this conceptual initiative is to improve productivity of the developers and implementers. The ability to make code (methods) release independent is extremely desirable and goes a long way towards improving the overall implementation time.

What Are Rules?

Business rules are configurable, generalized statements of how common processing methods are applied to a specific intersection of data. Business rules determine:

privileges—what a user can create, view, update, select, or delete.

application of business processes—what processes are accepted, such as buying with credit cards.

business relationships—relationships between selling and buying companies, e.g., what price list is used when Catalog X is selected or where the item is shipped to or from.

choices and default values—the defaults for options such as ship-to address or payment methods.

Figure 1:
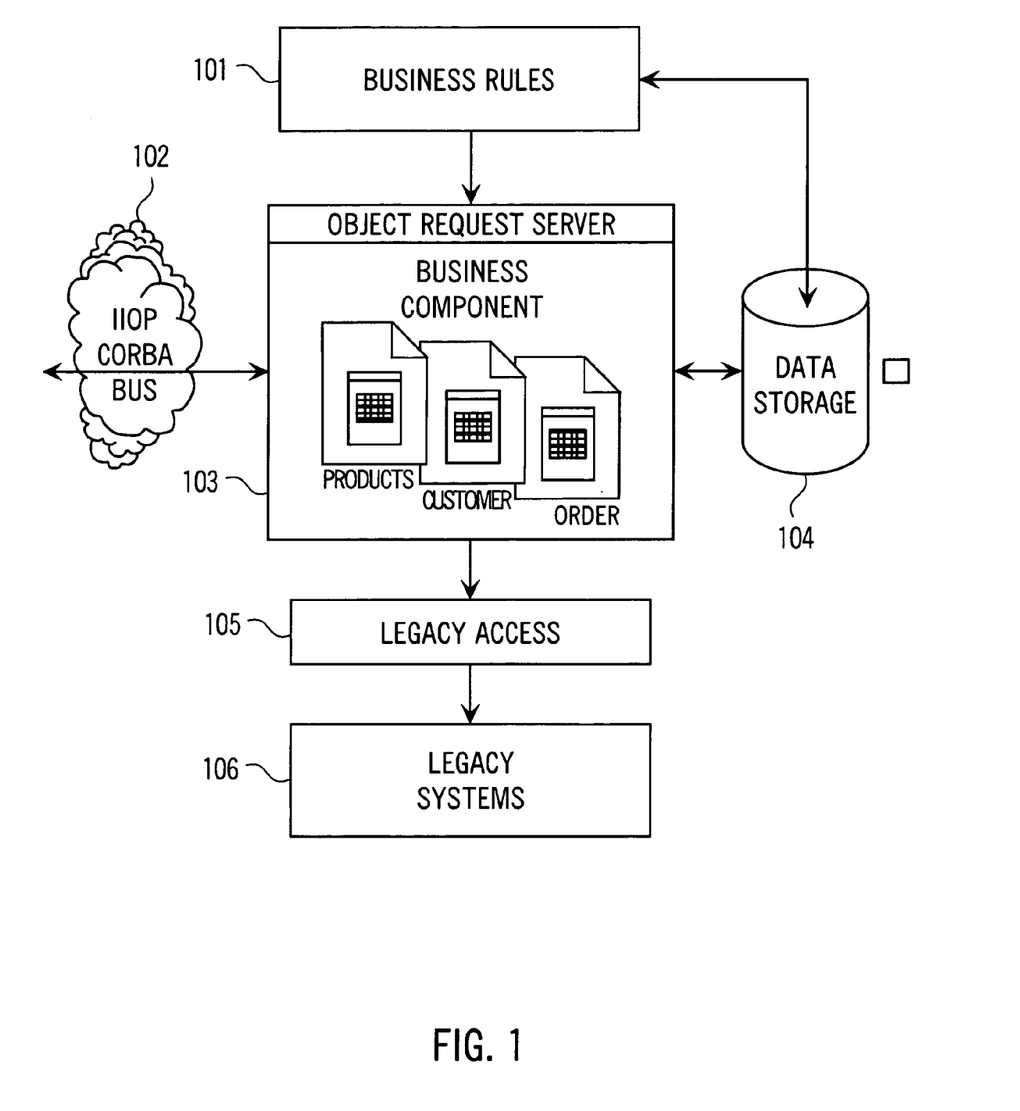
FIG. 1 is block schematic diagram of the relationship between the Business Rules Engine, the information database, and business objects of a preferred embodiment of the invention according to the invention.

Referring to FIG. 1, the invention's Business Rules engine 101 enables the user to customize the behavior of business objects 103 (for example, access control, order management, catalogs, and membership) to meet sophisticated business requirements. The invention provides a graphical user interface that allows a company to rapidly set up and maintain Business Rules in real time—with no source code recompilation needed.

Business Rules are not statements or any specific syntax. They are defined using an administration function which stores the required information into a database 104 that is formatted in a specific way and used by the rule resolution engine 101. The application designer identifies all of the decision points in an application. These decision points are separate instances of rules.

The rule administration function stores, for each rule: the application using the rule; the name of the rule; the objects involved in the interactions; and the method for resolving the conflicts between the interacting objects. This data is called the "rule for rules." The rule for rules database is rarely changed after it is initially set. It should only be changed by the appropriate user that is capable of understanding the impact that these types of changes may produce.

Each rule may have one to many classes of interacting objects. Each instance of these objects may have a data value (vote) for a specific rule. It is important to note that the administrative effort by most users will be focused on maintaining these values. The example above is an example of "data for rules."

The rule resolution engine 101 uses the rule for rules database 104 to control its behavior when it is called by an application business object 103.

The ease of use of the administration capability for very large and complex systems is often a critical factor in its acceptability by users when being implemented. The average user views the system as unusable when the underlying data has a very complex structure and complex interactions. However, when the system is simple and has very broad definitions of interactions, the system is viewed as inflexible and possibly unsuitable for a specific application.

These two opposing trends are addressed by the use of Business Rules. The invention combines the simplicity of having only one place to set parametric values and the ability to easily define complex interactions when required.

Figure 2:
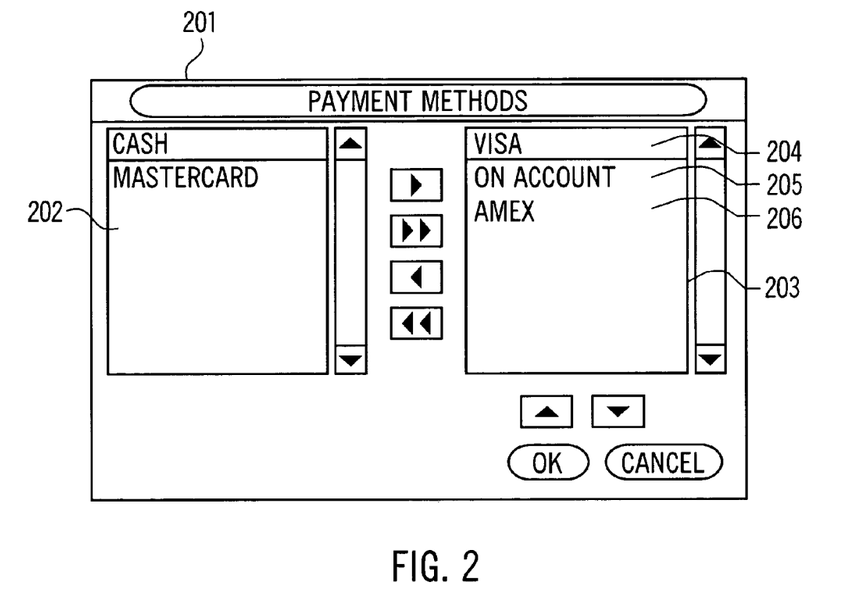
FIG. 2 is a schematic diagram of a graphical user interface (GUI) using a point and click metaphor for the administration of values in the invention according to the invention.

With respect to FIG. 2, the use of a "Point and Click" metaphor is the basis for the administration of values (Votes) within the invention. For example, the GUI 201 replaces a general choice list or drop down list that many applications would use. The box on the left side 202 represents the domain of possible values. The choice box on the right 203 represents the list of values chosen for this specific instance of the object.

The user (appropriate to the task) that administers this instance of the object has the choice of selecting values, and sequencing of values. Those values higher on the list have preference over those values lower on the list. Here, Visa 204 has preference over On Account 205, which has preference over Amex 206.

Another basic design problem with business application programs is the clear and concise statement of the parameters that need to be passed (API definition) to an application object. The quest to create reusable software objects has necessitated that the software objects be insulated from access to the outside environment except for those parameters that need to be passed from the outside (calling) program to the inside (called) program. This, in effect, freezes the interface API and does not allow it to be changed at execution time without considerable effort. The invention's Business Rules approach allows for dynamic interactions at run time.

Software components conceptually have three basic parts:
the definition of data, parameters, relationships, and schema.
the definition of methods or behaviors to apply to that data.
the control logic (if . . . then . . . else) used to decide which methods to be used.

A problem arises when the object no longer meets the requirements of the environment that it was designed to work within. The designers and implementers have to reconstruct the software component, which takes time and can be very disruptive.

The Business Rules approach moves a large part of the "If . . . then . . . else" logic outside of the software component and therefore removes the requirement to re-build the component every time there is a change in the decision making logic. It is also important to note that Business Rules currently do not create new methods or supply new types of data to these methods without the use of external calls or API's.

Rules have a finite logic path per rule. The logic path does not change with the size of the rule set. The primary reason for this is that any one specific Business Rule is discrete in nature and the execution of a specific set of rules is independent of how many rules may be in the system.

Business Rules belong to applications. For example, a set of rules may belong to a "selling" system, or a "buying" system. Applications do not share the same rules. They may share very similar rules, but not the same instance of a rule.

For example: A "selling" application may have a payment method rule where the preferences of the selling company may dominate the solution set. A "buying" application may have the same rule. However, the buying company preferences may dominate the solution set.

Rules belong to the domain of the dominant company as defined by the nature of the packaged application (e.g., Seller Companies dominate in a Seller application) when Business Rules are used in a multiple seller or buyer environment.

For example: Two "selling" companies are using a common installation of the software. In this case, a separate set of Business Rules must be provided for each selling company or domain.

Rule Components

The main components of a rule are:
voters
votes
resolution strategy

A voter is a member or business object such as a product, price list, or ship-to location that provides input to be evaluated by the rule. This input is known as votes. The voters have a specified sequence within a rule. This sequence determines the order in which a particular voter's votes are evaluated by the resolution strategy assigned to the rule.

Voters can be data objects, domain tables, or the results of other rules. For example, a voter represents a specific instance of a object that is related to the object (e.g., an order) being operated on by the calling program.

The designer has the ability to define:
The owner or domain of the objects to be used (e.g., Seller Company).
Classes of objects, domain tables, or other "rules" that can vote and from which to derive a value (Vote).
The sequence that they can vote.
The owner to that class of object (e.g., Selling Company).

Note: Business Rules can derive values or votes from other Business Rules. This allows for the construction of complex combinations of evaluation logic.

The Calling Object (e.g., a specific instance of an Order Object) will define the specific instances of the objects (Voters) to be used in the evaluation of a Business Rule at execution time.

For example: The shopping cart program (calling program) is currently working on a order object (A123), which is related to a specific instance of a seller object (XYZ Company), a specific buyer object (ABC Company), and a specific instance of a person (Rob). When a solution is "requested" from the rule engine the calling program has only to identify itself (Application="seller") and identify the target object (Order—A123). Based on this set of identifications the rule engine can "look-up" the rule and, based upon the rule and the target object, "look-up" the related votes (preferences) of the related instances (Rob, XYZ, and ABC).

Not all Voters are objects. Voters can also be a specific Business Rule. Rule results can be expressed as a "row of values." When this happens, one of the other values in the row can become a vote in a rule evaluation. The ability to reference another Business Rule allows for the construction of very complex logical decisions.

For example: The Business Rule (Freight Method) has three voters:
Selling Company
Buying Company
Payment Method (Rule)

In this example, the results of this rule are a function of the values or results of other rules. The Freight Method "Will Call" may have a Payment Method of "Cash and On Invoice." Where the Freight Method "FedEx" may have Payment Methods of "Cash, Credit Card, and On Invoice."

The Payment Method rule may be completely independent in construction, and may use a LIFO (discussed below) approach to selecting a result set from various voters.

Voters also have a hierarchical inheritance. For example, a rule (e.g., Can View XXX) has three voters (Company, Organization, and User Group). The Business Rule should allow a single "Yes" or "No" to dominate the voting results.

The voter class "User Group" represents all of the user groups a specific user may belong to. The voter class "Organization" represents the specific organization a specific user group may belong to. The voter class "Company" represents the owner of the user object.

Rule Attributes

Rule attributes are managed on the administrative forms for each type of rule voter. To change a voter's attribute for a particular rule, the appropriate administrator locates the field that sets the attribute for the rule and enters or selects a new attribute. For example, the attributes for the Default Price List rule for a buying company is set by the Price List entry on the company's Order Entry tab.

Rule Resolution Strategies

The primary purpose of a resolution strategy is to resolve any conflicts between specific preferences of voters and determine the correct answer to be used in an application program. The sequence of business objects and the order of the values included in each object determine the values of the results.

Rule resolution logic returns only one answer for a question for the set of business objects being referenced. The resolution strategies used are:
first in first out (FIFO)
The business objects are evaluated in the order that they appear on the system. The input is resolved following the order in which the votes appear in the first business object.
last in first out (LIFO)
The business objects are evaluated in the order they appear on the system. The votes are resolved by evaluating the last item in the last business object referenced first.
intersection of sets (IOS)
All of the business objects are evaluated on a FIFO basis. Items common to all sets are used to determine the value of the results.
union of sets (UOS)
All of the business objects are evaluated on a FIFO basis. The votes in each business object are added to the common result as they appear. Duplicate items are ignored.
highest
All of the business objects are evaluated. The votes in each business object are added to the common result. Votes are then ordered in descending order.

lowest
All of the business objects are evaluated. The votes in each business object are added to the common result. Votes are then ordered in ascending order.

To illustrate how the resolution logic is applied, consider a scenario using the Payment Method rule. The Payment Method rule determines what payment methods a user can select from when creating an order. This scenario assumes the following:

There are three voters for this rule: selling company; buying company; and buying company person.

The resolution strategy assigned to the Payment Method rule by the selling company is IOS.

Figure 3:
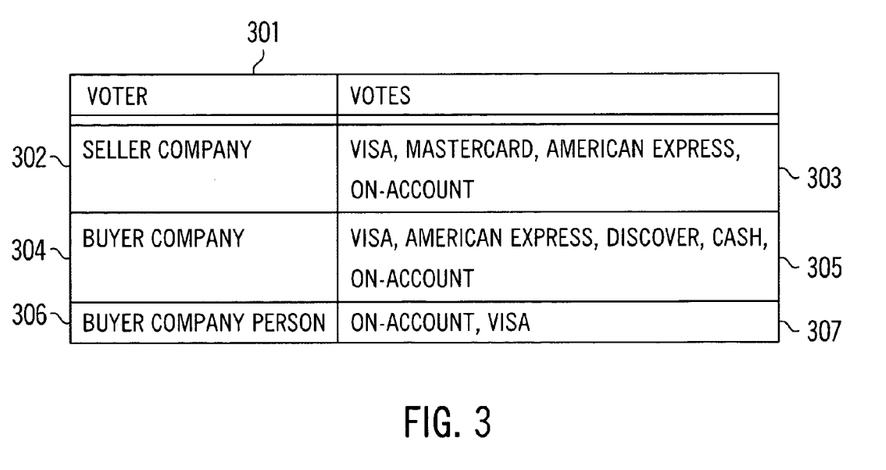
FIG. 3 is a table showing the preferences of three voters and their evaluation order according to the invention.
Figure 4:
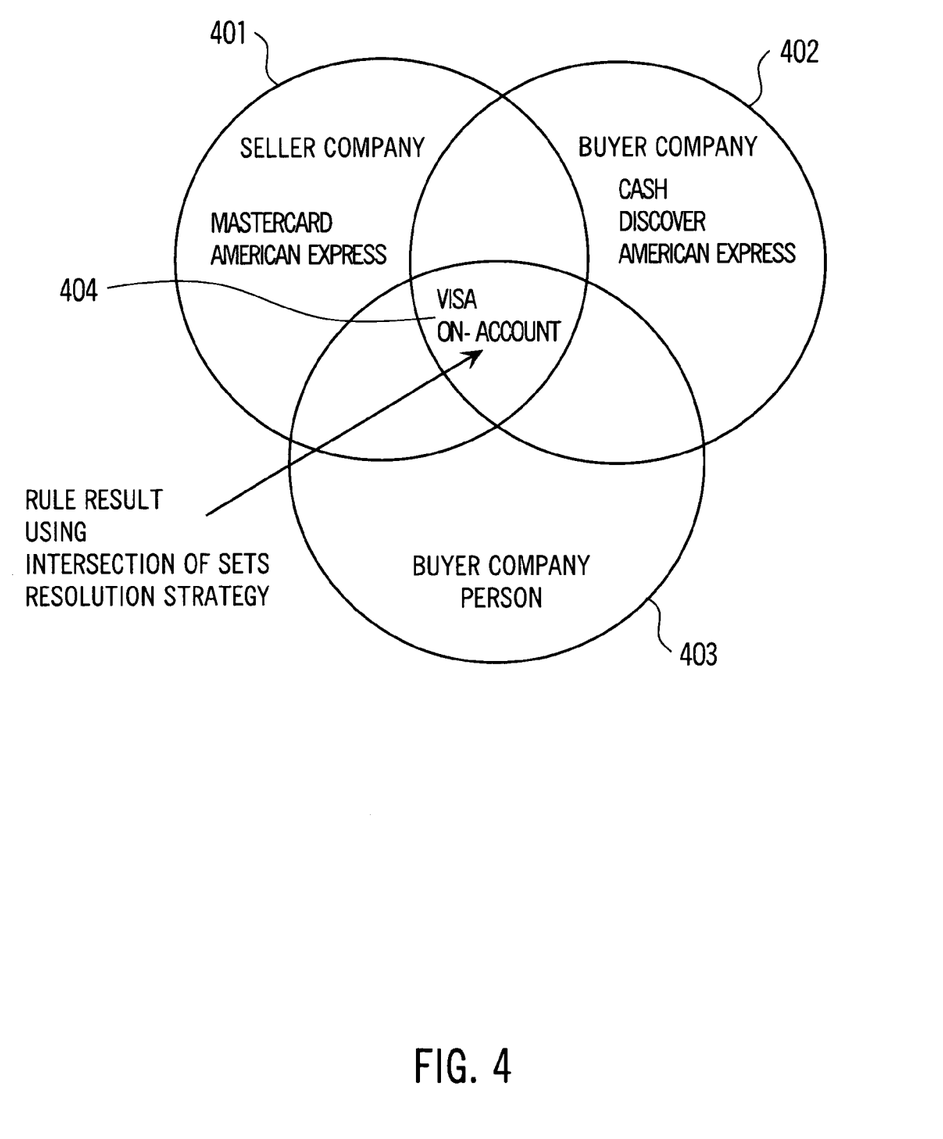
FIG. 4 is a block schematic diagram of an application of the intersection of sets (IOS) rule resolution strategy according to the invention.

Referring to FIGS. 3 and 4, the three voters are listed in evaluation sequence with their votes (attributes) for the Payment Method rule. Here, the seller company 302 is first in the evaluation sequence and has attribute values of Visa, MasterCard, American Express, and On-Account 304.

Using the IOS rule resolution strategy, the selling company 401, buying company 402, and buying company person 403 Payment Method preference sets are compared pictorially. The intersection of the three sets results in the solution set of Visa and On-Account 404.

Figure 5A:
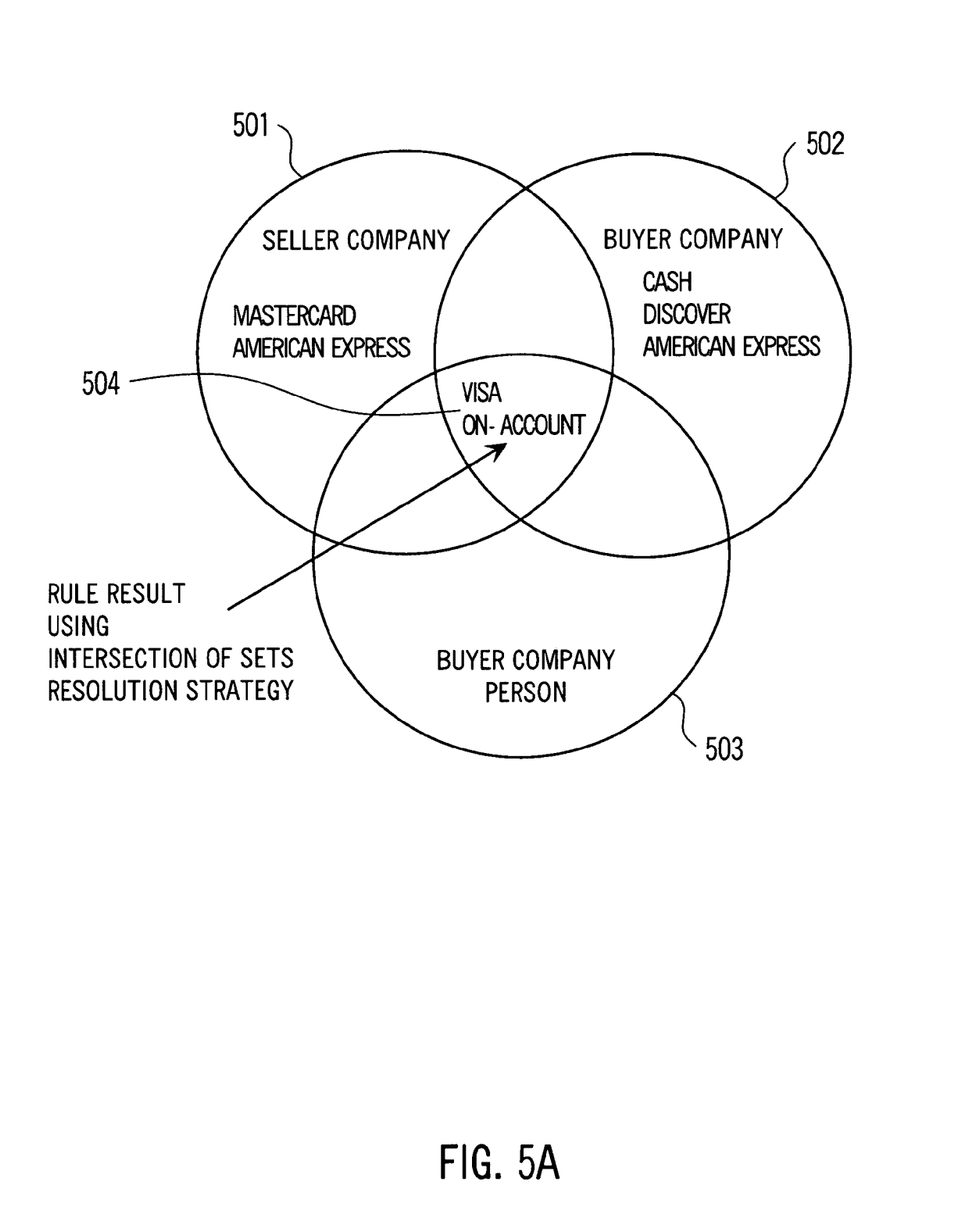
FIGS. 5a and 5b provide a block schematic diagram of an application of the intersection of sets (IOS) rule resolution strategy (FIG. 5a) and a table showing the results of different rule resolution strategies for a single example (FIG. 5b) according to the invention.
Figure 5B:
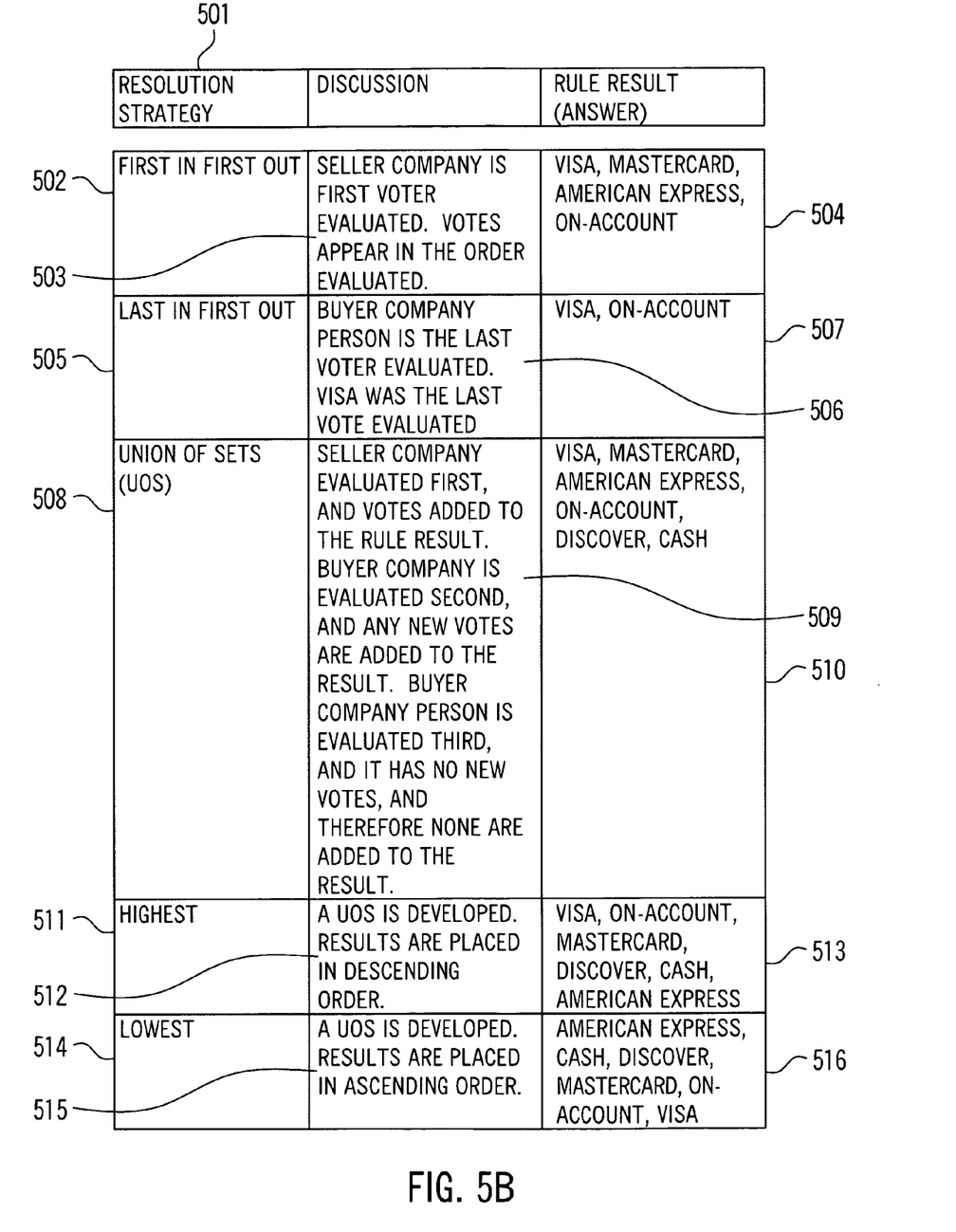

With respect to FIGS. 5a and 5b, an illustration of how the different resolution strategies affect the rule result in the scenario described above is shown 501 (FIG. 5a). For example, using a FIFO resolution strategy 502 where Seller Company is first voter evaluated 503 has the rule result of: Visa, MasterCard, American Express, and On-Account 504 (FIG. 5b).

Note: Voter sequence affects only FIFO (502) and LIFO (505) resolution strategies.

See also examples

For LIFO (505, 506, 507);
UOS (508, 509, 510);
Highest (511, 512, 513); and
Lowest (514, 515, 516).

The sequence of the voters and the values in a set determine the sequence of the values in the results. Using the above example, if the sequence of voting is changed from Seller Company, Buyer Company, and Buyer Company Person to Buyer Company Person, Seller Company, and Buyer Company, the result of the rule is:

FIFO: the answer is On-Account, Visa.
LIFO: the answer is On-Account, Cash, Discover, American Express, Visa.

In a business application example that involves product sales, the business rules will determine how the following objects behave:

pricing
product availability
terms and conditions
order management
payment methods
shipping methods
credit checking
external interfaces
taxation
admin access control
user access control
shipping charges There are three ways to affect the behavior of business rules:

rule attributes
voter sequence
rule resolution

Rule attributes are set by selecting or entering values on the appropriate administrative forms.

Business Rules are cached and the cache is generally flushed when administration of rules for rules or rules for data is performed. The cache is populated with values and null values by the instance of object and rule. The cache has values introduced into it when a specific instance of an object is first used (Demand Cache). Business Rules have three different levels of caching:

1. cache of the rule definitions (resolution, voters, etc.)

The cache of rule definitions occurs in the rules engine on the server. The cache of the rule definitions is loaded at application server start up time. Therefore, if a user wants to change how a rule is evaluated, e.g., from LIFO to UOS, he will have to restart the application servers. This will most likely be the rule engine and the front end application servers. This cache is static and does not get updated when the site administrator updates the program.

2. cache of the rule attributes in the attribute server

The cache of the rule attributes in the attribute server, which is attached to the OMS server and the membership server, is a global cache for any client accessing that particular server. This is purely a performance optimization. The votes for the rules are cached in the attribute server. When an administrator changes a vote this cache is updated. This cache should always reflect what is in the database.

3. cache of the rule attributes per session

The granularity of this cache is the life of the user's session. That is, after the user logs in, this cache is populated from the cache in the attribute server. The values in this cache evaluate the rules in the end-user interface. This cache is not automatically updated when an administrator changes rules. So, for the life of the session, the user sees a consistent version of rule values. There are only two situations when this cache is updated: during a re-login; or when the settable interval is reached and it reloads the cache.

The following is a conceptual example that will clarify many of the concepts described above. In this example, when a shopping cart is created, all of the fields have default values that are based on the preferences, and conform to the business rules, derived from the interaction of a buyer (Rob), selling company (XYZ Company), and the company of the buyer (ABC Company).

Figure 6:
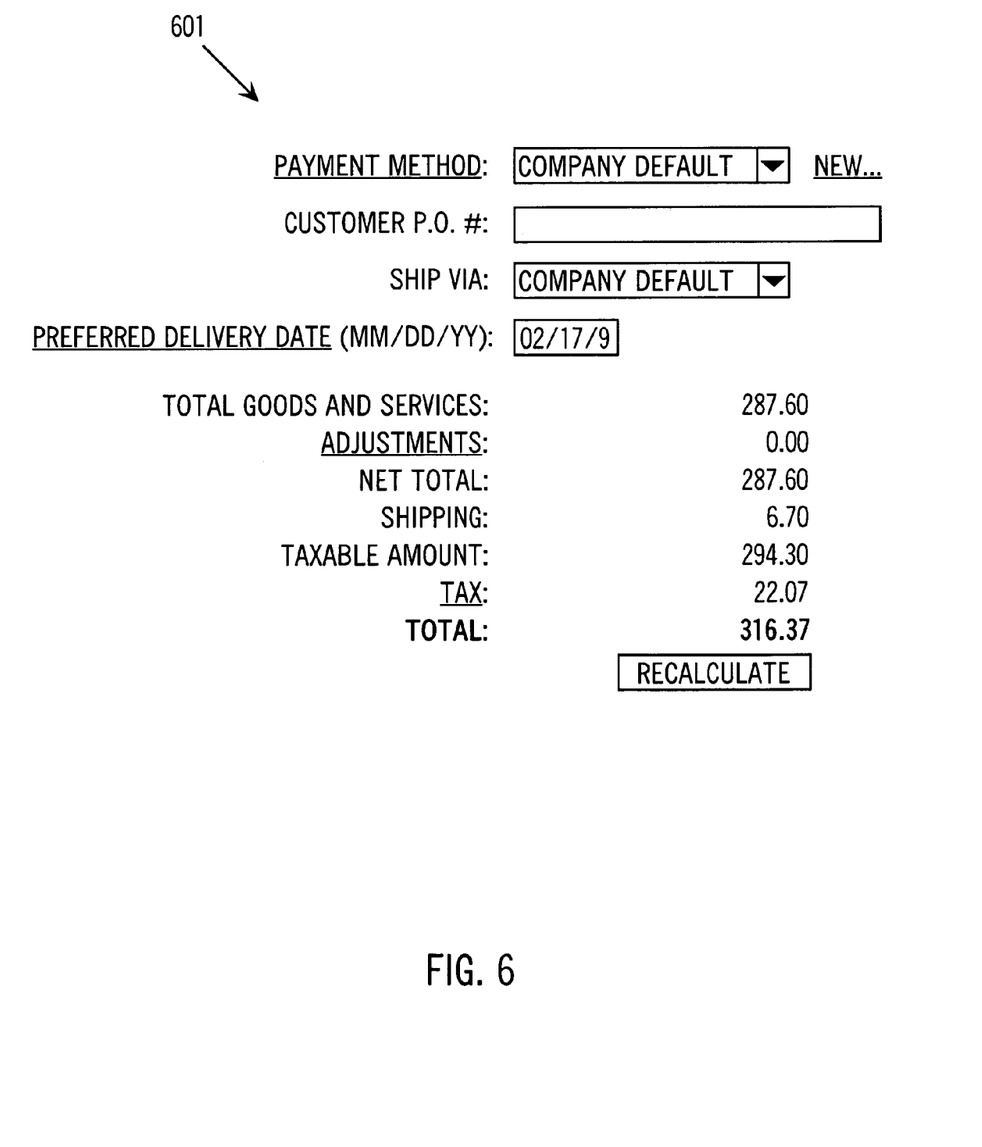
FIG. 6 is a schematic diagram of a set of default values used in a shopping cart example according to the invention.

Referring to FIG. 6, an example of some of the default values that might be found in a shopping cart are shown 601. The default values in an application are based on the interaction of specific instances of buyer, selling company, and buying company.

Figure 7:
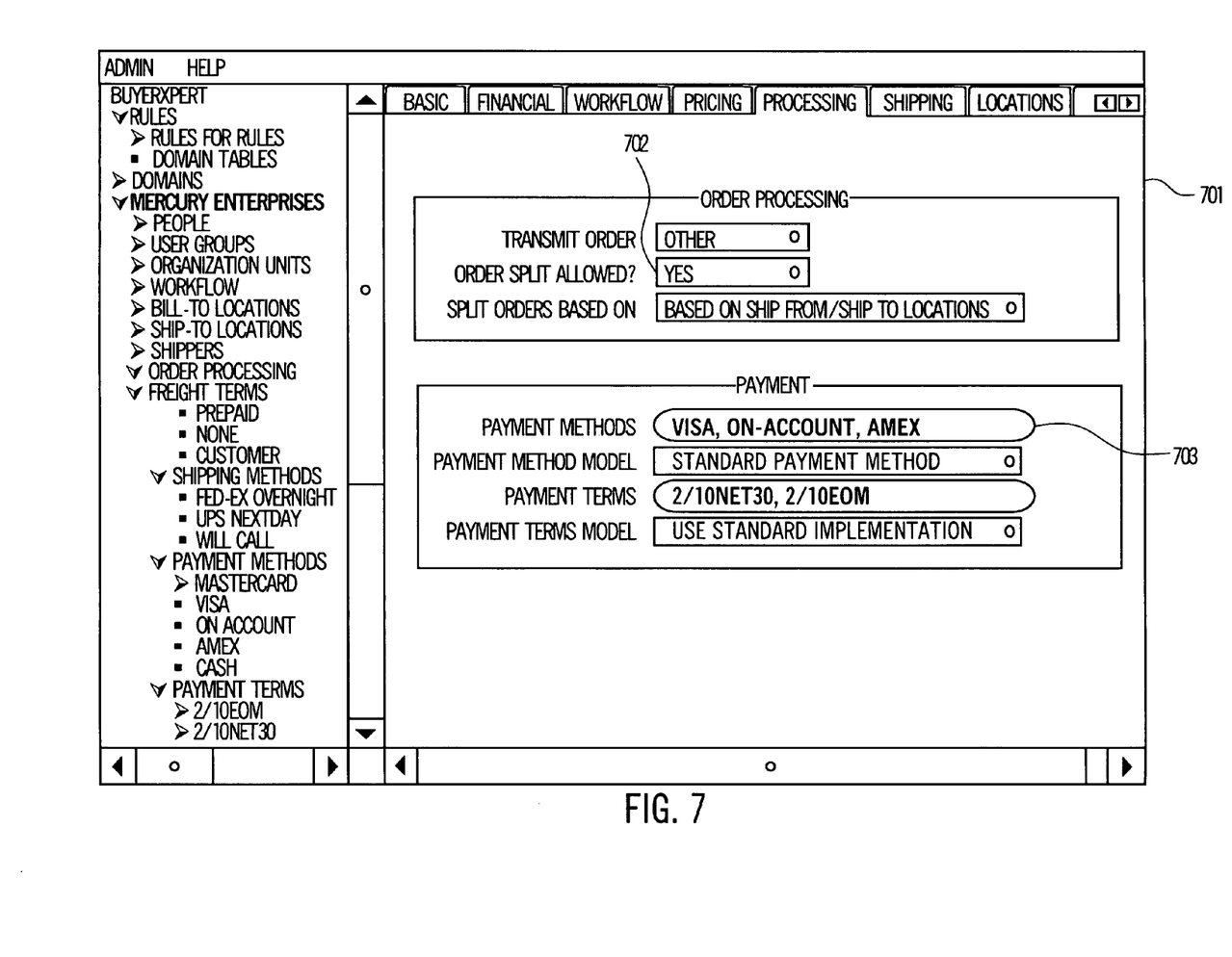
FIG. 7 is a schematic diagram of an administration GUI used by a company to maintain its preferences for a specific instance of an object according to the invention.

With respect to FIG. 7, a typical administration function allows the user to maintain the preferences for a specific instance of an object. Here, an example of an administration GUI panel for a specific company is shown 701. This company allows split orders 702. A specific set of acceptable payment methods for this company are Visa, On Account, and Amex 703.

Figure 8:
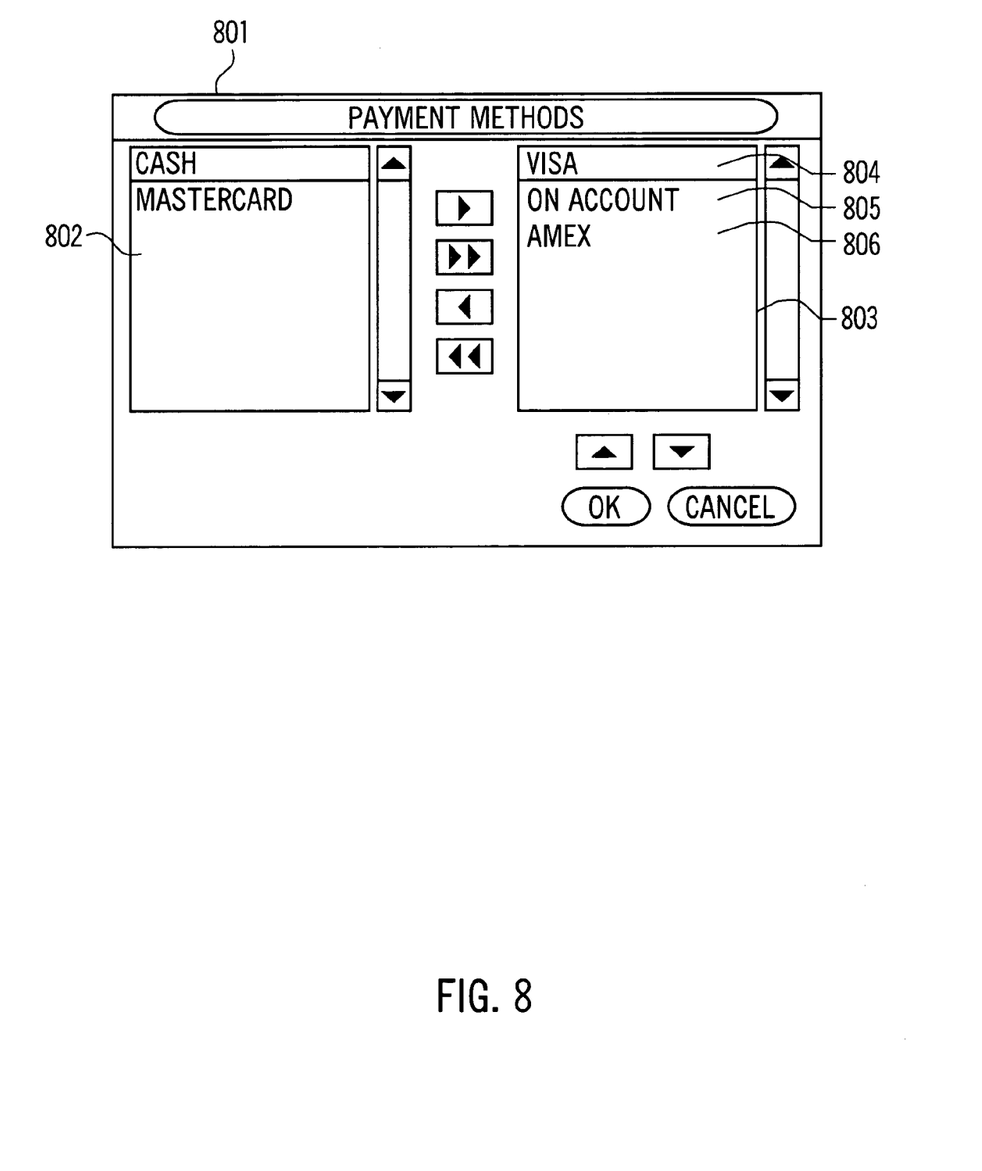
FIG. 8 is a schematic diagram of a selection GUI according to the invention.

Referring to FIG. 8, the administration GUI uses a "selection" type of GUI 801 to maintain a field of this type. In this example, the selection GUI left hand box 802 contains a set of values that are possible and the right hand box 803 represents a list of selected values. The sequence of these values implies preference within the set. Here, Visa 804 is preferred over Amex 806. However, all values on this list are acceptable forms of payment.

The selection GUI may have many forms based upon the type of results being expected. The results may be a simple yes/no, a single value, a row of values, or a table of values. All of these types of results may have variant GUI's from the GUI 801 shown.

Figure 9:
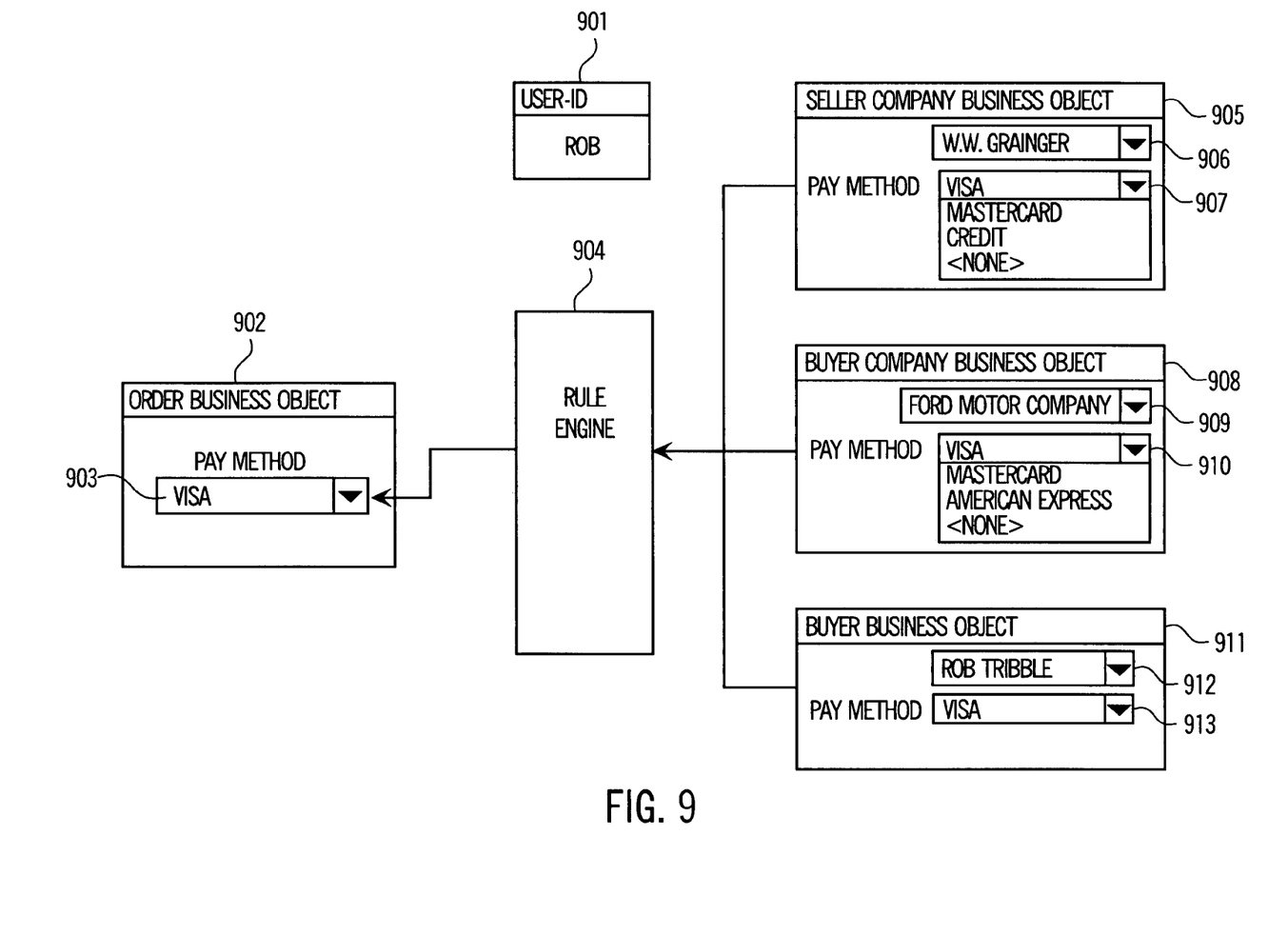
FIG. 9 is a block schematic diagram of an example of the relationship between the rule engine, a business object, and related objects according to the invention.

With respect to FIG. 9, a person (Rob) 901 has just created a shopping cart. The shopping cart (Order Business Object) 902 has a set of fields that require values 903. This example illustrates the relationship between the business object (order) 902 and the related objects (person 911, buying company 908, and selling company 905).

The Order Business Object 902 requests a set of values for the payment method field 903. The Rule Resolution Engine 904 recognizes the related objects (person 911, buying company 908, and selling company 905), which are also referred to as voters. The Rule Resolution Engine 904 finds the preferred values for "Payment Method" in each related object 907, 910, 913. Visa is the preferred payment method for the related objects 907, 910, 913 in this example.

The Rule Resolution Engine 904 resolves the conflict between the preferences (votes). In this example, the Rule Resolution Engine uses a rule resolution strategy of intersection of sets (IOS) to create a result (Visa) that is then used as a default value 903 by the Order Business Object 902.

Figure 10:
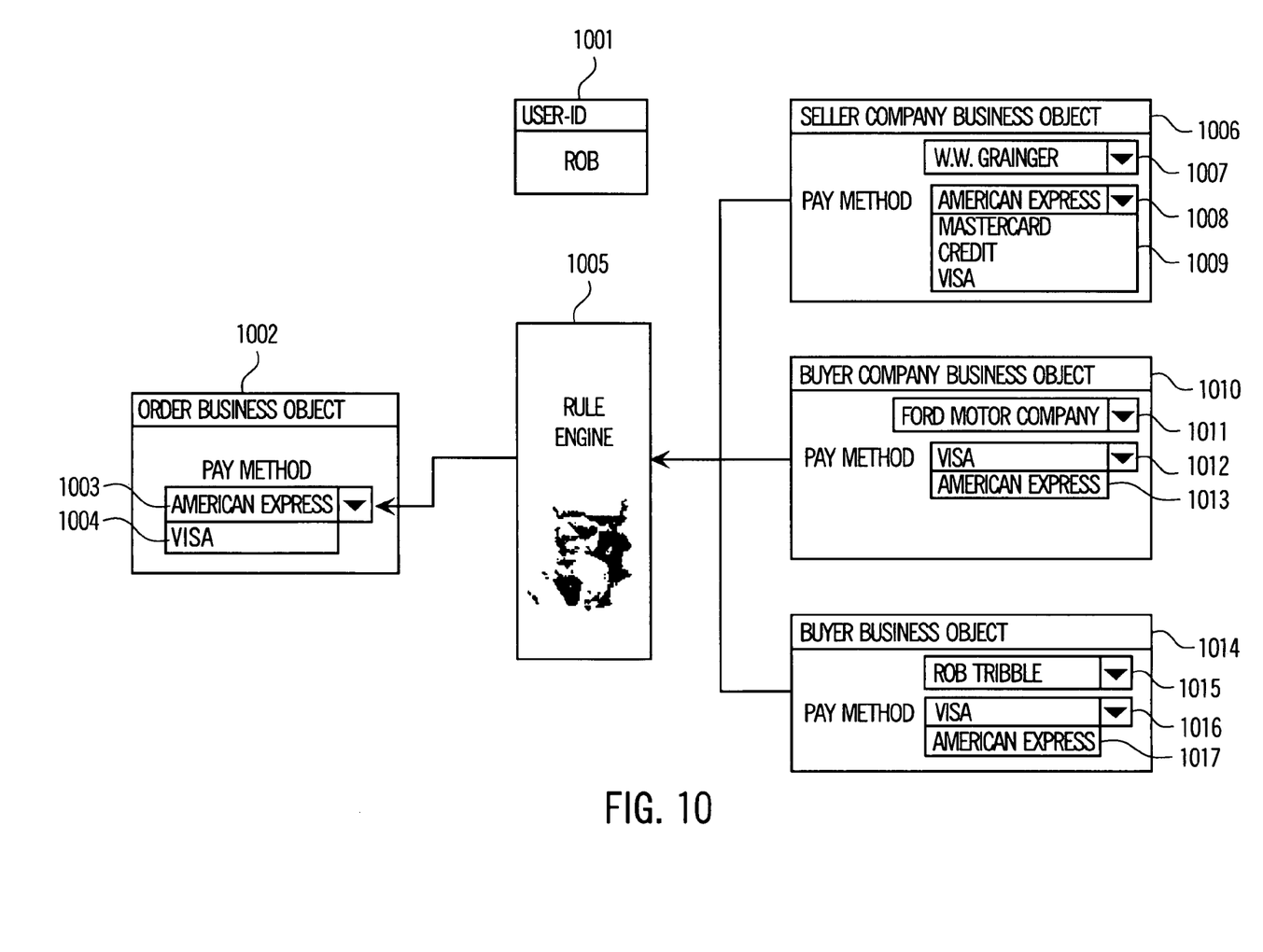
FIG. 10 is a block schematic diagram of an example of the relationship between the rule engine, a business object, and related objects using multiple value lists according to the invention.

Referring to FIG. 10, the behavior of the Rule Resolution Engine 1005 when there are multiple values that are acceptable to all of the voters that are related to this order object is shown. Using the rule resolution strategy of IOS, the solution set produced by the Rule Resolution Engine 1005 includes two entries (American Express 1003 & Visa 1004). Both values are acceptable to all of the related objects because both exist in the preferred payment methods in the selling company 1008, 1009, the buying company 1012, 1013, and the person 1016, 1017.

The sequence of the solution set results in Amex 1003 being the default value. Both values appear in the drop down choice list on the GUI 1002. The user may select either value. The sequence of the solution set is a function of the sequence of the "preferred" values or votes of the first voter. In this example, if the selling company organized the list with Visa first and Amex later, the solution set would have been reversed.

Figure 11:
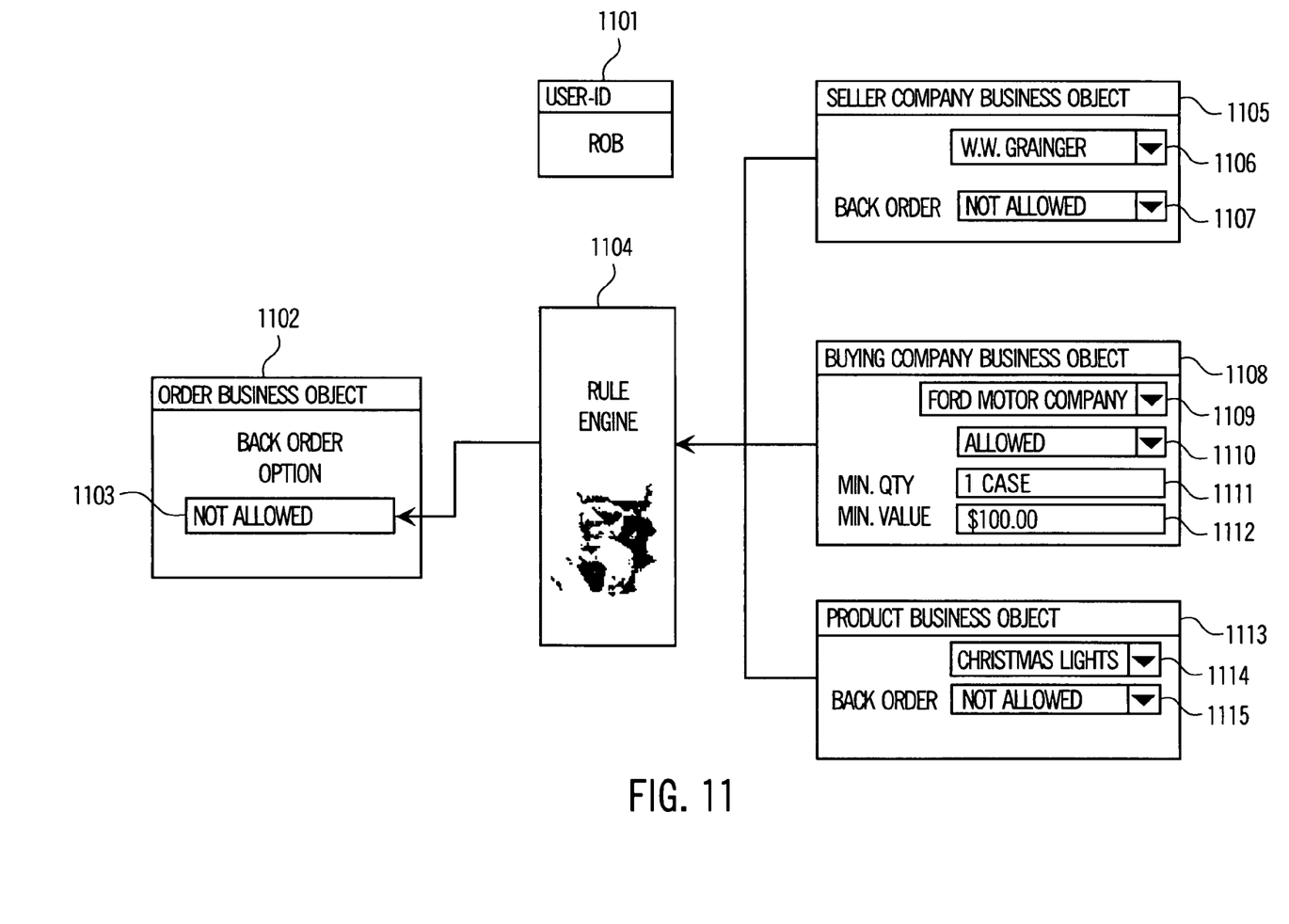
FIG. 11 is a block schematic diagram of an example of the relationship between the rule engine, a business object, and related objects using a more complex relationship schema according to the invention.

With respect to FIG. 11, a more complex rule resolution example is shown. In this case, the order object 1102 has been asked to add a line item to an order. In the process of adding that line item, the order object 1102 has performed an inventory availability check and has determined that inventory is not available. The order object 1102 then has to make a decision to create a backorder. The specific rule being evaluated here is "whether or not to track a backorder."

Here, Rob 1101 is buying 100,000 Christmas tree lights on Dec. 1, 1997 and the inventory is not available. The related objects (voters) are selling company 1105, buying company 1108, and product 1113.

The selling company 1105, as a rule, is not interested in tracking backorders and has set its preference to "Not Allowed" 1107.

The buying company 1108 is a special case and happens to be a very large customer that requires exceptional service. Therefore, the preference for tracking backorders has been set to "Allowed" 1110. Note that certain limits have been expressed to control the size of the backorders. The minimum quantity is one case 1111 and the minimum value is $100.00 1112.

The product 1113 is also a special case. Christmas lights 1114 are not allowed to be backordered 1115.

The proper solution in this example is determined by using a rule resolution method of last-in-first-out (LIFO). In this case, the correct answer is "Not Allowed" 1103.

From a business viewpoint, this is exactly the correct answer because, by the time the selling company fills the backorder, the selling season for the product will be over. Therefore, the selling company may not accept delivery, may return the product, or "No Sale" will occur.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for evaluating business objects with no prior association and creating dynamic solution sets based on said evaluation in a computer environment, comprising the steps of:
   providing a rule engine;
   wherein said rule engine evaluates said business objects;
   providing administration means for allowing a user to maintain preferences for a specific instance of a business object;
   wherein said rule engine uses business rules to evaluate a relationship between said business objects;
   wherein each business object is a voter that provides votes that are evaluated by said business rules;
   providing rule resolution strategy means for resolving conflicts between specific preferences of voters and determining a correct solution set; and
   wherein a sequence of voters and an order of the votes included for each voter determine values in said solution set.

2. The process of claim 1, further comprising the steps of:
   providing domain tables;
   wherein said tables are used to define the overall set of possible values for a given attribute of a business object; and
   wherein said tables are static, configured, or dynamic in nature.

3. The process of claim 1, wherein said business rules are configurable, generalized statements of how common processing methods are applied to a specific intersection of data; and wherein said business rules determine privileges, application of business processes, business relationships, choices, and default values.

4. The process of claim 1, further comprising the step of:
   providing rule administration means for allowing a user to define business rule attributes.

5. The process of claim 1, wherein said rule engine returns one solution set for the set of business objects (voters) being referenced.

6. The process of claim 1, wherein said business rules are cached.

7. An apparatus for evaluating business objects with no prior association and creating dynamic solution sets based on said evaluation in a computer environment, comprising:
   a rule engine;
   wherein said rule engine evaluates said business objects;
   administration means for allowing a user to maintain the preferences for a specific instance of a business object;
   wherein said rule engine uses business rules to evaluate a relationship between said business objects;

wherein each business object is a voter that provides votes that are evaluated by said business rules;

rule resolution strategy means for resolving conflicts between specific preferences of voters and determining a correct solution set; and wherein the sequence of voters and the order of the votes included for each voter determines values in said solution set.

8. The apparatus of claim 7, further comprising:

domain tables;

wherein said tables are used to define the overall set of possible values for a given attribute of a business object; and wherein said tables are static, configured, or dynamic in nature.

9. The apparatus of claim 7, wherein said business rules are configurable, generalized statements of how common processing methods are applied to a specific intersection of data; and wherein said business rules determine privileges, application of business processes, business relationships, choices, and default values.

10. The apparatus of claim 7, further comprising:

rule administration means for allowing a user to define business rule attributes.

11. The apparatus of claim 7, wherein said rules engine returns one solution set for the set of business objects (voters) being referenced.

12. The apparatus of claim 7, wherein said business rules are cached.

13. A program storage medium readable by a computer, tangibly embodying a program of instructions executable by the computer to perform method steps for evaluating business objects with no prior association and creating dynamic solution sets based on said evaluation in a computer environment, comprising the steps of:

providing a rule engine;

wherein said rule engine evaluates said business objects;

providing administration means for allowing a user to maintain preferences for a specific instance of a business object;

wherein said rule engine uses business rules to evaluate a relationship between said business objects;

wherein each business object is a voter that provides votes that are evaluated by said business rules;

providing rule resolution strategy means for resolving conflicts between specific preferences of voters and determining a correct solution set; and wherein the sequence of voters and the order of the votes included for each voter determines values in said solution set.

14. The method of claim 13, further comprising the steps of:

providing domain tables;

wherein said tables are used to define the overall set of possible values for a given attribute of a business object; and wherein said tables are static, configured, or dynamic in nature.

15. The method of claim 13, wherein said business rules are configurable, generalized statements of how common processing methods are applied to a specific intersection of data; and wherein said business rules determine privileges, application of business processes, business relationships, choices, and default values.

16. The method of claim 13, further comprising the step of:

providing rule administration means for allowing a user to define business rule attributes.

17. The method of claim 13, wherein said rule engine returns one solution set for the set of business objects (voters) being referenced.

18. The method of claim 13, wherein said business rules are cached.

\* \* \* \* \*